(12) United States Patent
Ji et al.

(10) Patent No.: US 12,040,879 B2
(45) Date of Patent: Jul. 16, 2024

(54) SYSTEMS AND METHODS FOR REMOTE PILOT COMMUNICATION VIA GROUND-BASED COMMUNICATION GATEWAY DEVICE(S)

(71) Applicant: Honeywell International Inc., Charlotte, NC (US)

(72) Inventors: Li Ji, Beijing (CN); Zhong Chen, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 209 days.

(21) Appl. No.: 17/563,496

(22) Filed: Dec. 28, 2021

(65) Prior Publication Data

US 2023/0208506 A1   Jun. 29, 2023

(51) Int. Cl.
*H04B 7/185* (2006.01)
*H04W 76/32* (2018.01)
(Continued)

(52) U.S. Cl.
CPC ..... *H04B 7/18506* (2013.01); *H04B 7/18504* (2013.01); *H04W 76/32* (2018.02); *H04W 76/40* (2018.02); *H04W 84/18* (2013.01)

(58) Field of Classification Search
CPC ....... B64C 39/024; B64C 19/00; B64C 13/18; B64C 39/022; G08G 5/0069;
(Continued)

(56) References Cited

U.S. PATENT DOCUMENTS 8,437,956 B2   5/2013   Limbaugh et al.
8,838,289 B2   9/2014   Margolin
(Continued)

FOREIGN PATENT DOCUMENTS

CN   109753083 A   5/2019
EP   3734760 A1   11/2020
(Continued)

OTHER PUBLICATIONS

Extended European search report and search opinion Mailed on Sep. 5, 2023 for EP Application No. 22216698, 12 page(s).
(Continued)

*Primary Examiner* — Khalid W Shaheed
(74) *Attorney, Agent, or Firm* — Alston & Bird LLP

(57) ABSTRACT

Disclosed are methods, systems, and computer-readable medium for facilitating remote user airspace communication. For instance, the method may include: connecting with a user device associated with and remote from a first vehicle in a shared air traffic control sector; receiving voice communication data from at least one of the user device, a second vehicle in the shared air traffic control sector, and an air traffic control station in the shared air traffic control sector; generating analog data or digital data based on the received voice communication data; determining a recipient for the generated analog data or generated digital data in the shared air traffic control sector; transmitting the generated analog data or generated digital data to the recipient; and terminating the connection with the user device as the first vehicle leaves the shared air traffic control sector.

19 Claims, 5 Drawing Sheets

(51) Int. Cl.
*H04W 76/40* (2018.01)
*H04W 84/18* (2009.01)

(58) Field of Classification Search
CPC .............. G08G 5/0013; G08G 5/0043; H04B 7/18506; H04B 7/18502; H04W 84/06
See application file for complete search history.

(56) References Cited

U.S. PATENT DOCUMENTS

| | | | |
|---|---|---|---|
| 9,119,210 B2 | 8/2015 | Williams | |
| 9,401,758 B2 | 7/2016 | Bosworth | |
| 9,412,278 B1 * | 8/2016 | Gong | G06F 21/44 |
| 9,927,807 B1 * | 3/2018 | Ganjoo | H04W 4/38 |
| 10,026,323 B2 | 7/2018 | Limbaugh et al. | |
| 2016/0328983 A1 | 11/2016 | Hutchinson et al. | |
| 2018/0005533 A1 | 1/2018 | Lohmiller et al. | |
| 2020/0287619 A1 | 9/2020 | Tavner et al. | |
| 2020/0341135 A1 | 10/2020 | Jiang et al. | |
| 2021/0084480 A1 * | 3/2021 | Maier | H04W 4/90 |
| 2022/0115008 A1 * | 4/2022 | Pust | G08G 5/0013 |
| 2022/0335841 A1 * | 10/2022 | Huncha | G08G 5/0034 |

FOREIGN PATENT DOCUMENTS

| | | |
|---|---|---|
| WO | 2018/187889 A1 | 10/2018 |
| WO | 2021079108 A1 | 4/2021 |

OTHER PUBLICATIONS

Supplementary European search report Mailed on Jun. 2, 2023 for EP Application No. 22216698, 14 page(s).

* cited by examiner

SYSTEMS AND METHODS FOR REMOTE PILOT COMMUNICATION VIA GROUND-BASED COMMUNICATION GATEWAY DEVICE(S)

TECHNICAL FIELD

Various embodiments of the present disclosure relate generally to systems and methods for communication between a remote pilot and air traffic control and/or other aerial vehicles, and more particularly to systems and methods for enabling remote pilot communication via ground-based communication gateway device(s).

BACKGROUND

As the urban air mobility (UAM) industry expands, UAM vehicles will begin to populate airspaces previously occupied by commercial air transport and general aviation aircraft. Urban air mobility (UAM) is an aviation industry term for on-demand passenger or cargo-carrying air transportation services, typically flown without a pilot on board (e.g., remotely operated). In order to comply with certain aviation regulations when operating vehicles in a controlled airspace and flying with instrument flight rules, a remote pilot may be used to maintain continuous, or at least near-continuous, two-way voice communication with air traffic control. Continuous voice communication between other vehicles, such as manned vehicles, in the same air traffic control sector and air traffic control may also be important for all parties within the same air traffic control sector to provide situational awareness.

Traditional methods for voice communication between remote piloted UAM vehicles and air traffic control as well as other vehicles within the same air traffic control sector include air to ground very high frequency (VHF) radio, or other means, such as via satellite, terrestrial relay, data link, and internet-based systems. For instance, a radio (e.g. VHF radio) for exchanging voice communication data with other radios in an air traffic control sector (e.g., an air traffic control radio or a manned aircraft radio) may be installed on board a remote piloted UAM vehicle and the UAM vehicle may be configured to communicate with a remote pilot at a ground station. However, such methods for voice communication may result in delays in communication, loss of communication (e.g., communication failure), congested radio channels, poor reception and/or transmission quality, miscommunication, and overuse of bandwidth.

Furthermore, existing methods and systems for voice communication may involve a remote pilot performing tasks that divert their attention from operating the UAM vehicle, such as manually tuning a radio to the appropriate frequency each time the UAM vehicle enters a different air traffic control sector.

The present disclosure is directed to overcoming one or more of these above-referenced challenges.

SUMMARY OF THE DISCLOSURE

According to certain aspects of the disclosure, systems, methods, and computer-readable medium are disclosed for facilitating remote user airspace communication.

For instance, a method may include establishing a connection between a user device associated with and remote from a first vehicle, and a first ground communication device from a plurality of connected ground communication devices when a flight path of the first vehicle is in proximity to the first ground communication device and a first air traffic control sector including the first ground communication device and a first air traffic control sector radio interfaced with the first ground communication device; receiving by the first ground communication device, voice communication data in the form of digital data or analog data from at least one of the user device associated with the first vehicle, a second vehicle tuned to the first air traffic control sector radio, and an air traffic control station located in the first air traffic control sector; generating, by the first ground communication device, analog data or digital data based on the received voice communication data, received from the user device, and/or the second vehicle, and/or the first air traffic control station located in the first air traffic control sector; determining, by the first ground communication device, a recipient for the analog data or digital data; transmitting, from the first ground communication device, the generated analog data or the generated digital data to the recipient; terminating the connection between the user device and the first ground communication device when the first vehicle approaches a second air traffic control sector, including a second ground communication device from the plurality of connected ground communication devices and a second air traffic control sector radio interfaced with the second ground communication device; and establishing a connection between the user device and the second ground communication device when the flight path of the first vehicle is in proximity to the second ground communication and the second air traffic control sector.

A system may include a user device, associated with and remote from a vehicle; at least one air traffic control sector radio located in at least one air traffic control sector including a ground communication device connected with a plurality of connected ground communication devices, the at least one air traffic control sector radio interfaced with the ground communication device; and at least one ground communication device connected with a plurality of connected ground communication devices. The user device may be configured to: establish a connection with a ground communication device from a plurality of connected ground communication devices, located in an air traffic control sector, when a flight path of the vehicle is in proximity of the ground communication device; transmit analog data or digital data to a ground communication device selected from a plurality of connected ground communication devices, once a connection has been established between the user device and the ground communication device; receive analog data or digital data from a ground communication device selected from a plurality of connected ground communication devices, once a connection has been established between the user device and the ground communication device; and switch a connection with a ground communication device from a plurality of connected ground communication devices to a connection with a different ground communication device from the plurality of connected ground communication devices, located in a different air traffic control sector, when the flight path of the vehicle is in proximity to the different ground communication device. Each ground communication device may be configured to: connect with a user device associated with and remote from a vehicle, when a flight path of the vehicle is in proximity to the ground communication device; receive voice communication data from at least one of the user device associated with the vehicle, a second vehicle tuned to an air traffic control sector radio interfaced with the ground communication device, and an air traffic control station in proximity to the ground communication device; generate analog data or digital data based on the received voice communication data; and transmit the generated analog data or digital data to at least one of the user device, the second vehicle, and the air traffic control station in proximity to the ground communication device.

A non-transitory computer-readable medium may store instructions that, when executed by a processor, cause the processor to perform a method. The method may include: connecting with a user device associated with and remote from a first vehicle in a shared air traffic control sector; receiving voice communication data in the form of digital data or analog data from at least one of the user device associated with the first vehicle, a second vehicle in the shared air traffic control sector, and an air traffic control station in the shared air traffic control sector; generating analog data or digital data based on the received communication data; determining a recipient for the generated analog data or generated digital data in the shared air traffic control sector; transmitting the generated analog data or generated digital data to the recipient; and terminating the connection with the user device as the first vehicle leaves the shared air traffic control sector.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
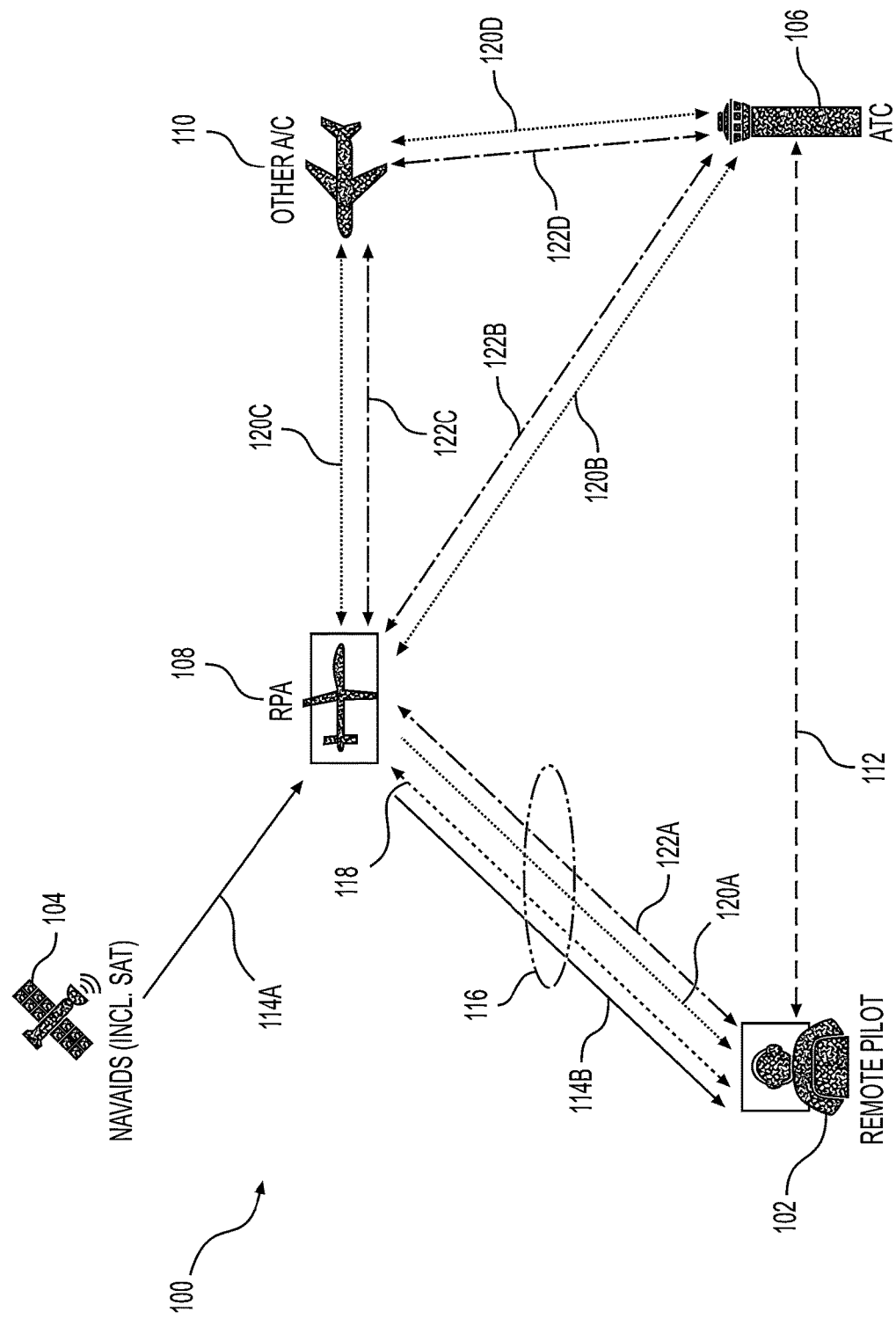
FIG. 1 depicts an example environment in which methods, systems, and other aspects of the present disclosure may be implemented.

Various embodiments of the present disclosure relate generally to systems and methods for facilitating remote user airspace communication.

In general, the present disclosure is directed to systems and methods for communication between a remote pilot and air traffic control and/or other aerial vehicles, and more particularly to systems and methods for enabling remote pilot communication via ground-based communication gateway device(s). In particular, a connection may be established between a user device and a first ground communication device when a flight path of the first vehicle is in proximity to the first ground communication and a first air traffic control sector. The user device may be associated with and remote from a first vehicle. The first ground communication device may be selected from a plurality of connected ground communication devices and the first air traffic control sector may include the first ground communication device and a first air traffic control sector radio interfaced with the first ground communication device. The method may also include: receiving, by the first ground communication device, communication data in the form of analog data or digital data, from at least one of the user device associated with the first vehicle, a second vehicle tuned to the first air traffic control sector radio, and an air traffic control station located in the first air traffic control sector; generating, by the first ground communication device, analog data or digital data based on the received communication data; determining, by the first ground communication device, a recipient for the analog data or digital data; and transmitting, from the first ground communication device, the generated analog data or the generated digital data to the recipient.

In addition, the method may include terminating the connection between the user device and the first ground communication device when the first vehicle approaches a second air traffic control sector, including a second ground communication device from the plurality of connected ground communication devices and a second air traffic control sector radio interfaced with the second ground communication device; and establishing a connection between the user device and the second ground communication device when the flight path of the first vehicle is in proximity to the second ground communication device and the second air traffic control sector.

The first ground communication device as well as each ground communication device from the plurality of connected ground communication devices may serve as a gateway that bridges communication between a remote pilot operating a vehicle (e.g., UAM vehicle) in the same air traffic control sector as other vehicles and in which an air traffic control sector radio is located. Each ground communication device may be configured to interface with an air traffic control sector radio. For the purposes of the present disclosure, an air traffic control sector radio (e.g., first air traffic control sector radio) located in an air traffic control sector (e.g., first air traffic control sector) may be used to receive communication data (e.g., analog data or digital data) from other vehicles (e.g., second vehicle) in the air traffic control sector and/or from an air traffic control station in the air traffic control sector. The received communication data may be transmitted from the air traffic control sector radio to the ground communication device (e.g., first ground communication) and the ground communication device may transmit the communication data to the user device after processing said communication data. In addition to transmitting communication data to the ground communication device, the air traffic control sector radio may receive communication data from the user device through the ground communication device. Therefore, communication data from other vehicles and/or air traffic control located within an air traffic control sector may be delivered to a remote user device via the ground communication (gateway) device located within said air traffic control sector and communication data from the remote user device may be delivered to the other vehicles and/or air traffic control located within the air traffic control sector via the ground communication (gateway) device interfaced with the air traffic control sector radio.

The present disclosure may utilize a system that allows a user device associated with and remote from a vehicle to switch connections with a ground communication device from a plurality of connected ground communication devices, each time the vehicle enters a different air traffic control sector containing one of the ground communication devices and an air traffic control station. Switching a connection with a ground communication device from a plurality of connected ground communication devices may include disconnecting an existing connection with the ground communication device and establishing a new connection with a different ground communication device. In some examples, at least one other vehicle (e.g., aerial vehicle or aircraft) may be present in each air traffic control sector.

For instance, a system of the present disclosure may include a remote user device associated with a vehicle. The (remote) user device may be configured to establish a connection with a ground communication device from a plurality of connected ground communication devices, located in an air traffic control sector, when a flight path of the vehicle is in proximity to the ground communication device; transmit analog data or digital data to a ground communication device selected from a plurality of connected ground communication devices, once a connection has been established between the user device and the ground communication device; receive analog data or digital data from a ground communication device selected from a plurality of connected ground communication devices, once a connection has been established between the user device and the ground communication device; and switch a connection with a ground communication device from a plurality of connected ground communication devices to a connection with a different ground communication device from the plurality of connected ground communication devices, located in a different air traffic control sector, when the flight path of the vehicle is in proximity to the different ground communication device. In some examples, the user device may be configured to switch the connection with a ground communication device, automatically, without user intervention. In other examples, the user device may be configured to switch the connection with a ground communication device, semi-automatically.

The system may also include at least one air traffic control sector radio located in at least one air traffic control sector comprising a ground communication device connected with a plurality of connected ground communication devices. The at least one air traffic control sector radio may interface with a ground communication device. In some embodiments, the at least one air traffic control sector radio may be configured to: receive voice communication data from an air traffic control station and/or a second vehicle tuned to the air traffic control sector radio; transmit voice communication data received from the air traffic control station and/or the second vehicle to a ground communication device interfaced with the air traffic control sector radio; and receive voice communication data from the ground communication device interfaced with the air traffic control sector radio; and transmit voice communication data received from the ground communication device to the air traffic control station and/or the second vehicle, wherein the ground communication device receives voice communication data from and transmits voice communication to a user device. In at least one embodiment, the at least one air traffic control sector radio may be further configured to: have a suppression line linked between the air traffic control sector radio and other radios located in the same air traffic control sector, wherein a suppression signal is generated when the air traffic control sector radio transmits voice communication data or when one of the other radios transmits voice communication data.

The system of the present disclosure may also include at least one ground communication device connected with a plurality of connected ground communication devices. Each ground communication device may be configured to: connect with a user device associated with and remote from a vehicle, when a flight path of the vehicle is in proximity to the ground communication device; receive voice communication data from at least one of the user device, a second vehicle tuned to an air traffic control sector radio interfaced with the ground communication device, and an air traffic control station in proximity to the ground communication device; generate analog data or digital data based on the received voice communication data; and transmit the generated analog data or digital data to at least one of the user device, the second vehicle, and the air traffic control station in proximity to the ground communication device. In some embodiments of the present disclosure, the plurality of connected ground communication devices may form an expandable network infrastructure that enables communication of data between any node within the network. In certain aspects of the present disclosure, the at least one ground communication device may be further configured to: command an air traffic control sector radio interfaced with the ground communication device into transmitting mode and/or command an air traffic control sector radio interfaced with the ground communication device into receiving mode.

Therefore, the systems and methods of the present disclosure can enable continuous, or at least near continuous, two-way communication between a remote user operating a vehicle (e.g., remote pilot) and air traffic control, as well as other vehicles in a shared air traffic control sector, by providing a single channel for receiving and transmitting communication data (e.g., analog data and digital data) for all entities within the same air traffic control sector. Allowing the user device associated with and remote from a vehicle to switch connections with a ground communication device selected from a plurality of connected ground communication devices (e.g., ad hoc network) each time the vehicle enters a different air traffic control sector, may help to ensure continuous voice communication between a remote pilot and air traffic control as well as other vehicles in an air traffic control sector throughout the entire flight of the remote pilot. Not only does the present disclosure enable continuous, or at least near continuous, communication, but the systems, methods, and non-transitory computer-readable medium of the present disclosure may also allow a remote pilot to focus on other aspects of operating a vehicle as opposed to manually tuning the radio upon entering a new air traffic control sector. Further, systems and methods of the present disclosure may help to preserve the bandwidth of a data link between the vehicle and the remote pilot at a ground station, since the remote pilot will be able to communicate with air traffic control and/or other vehicles through the ground communication (gateway) device.

While this disclosure describes the systems and methods with reference to UAM vehicles, it should be appreciated that the present systems and methods are also applicable to management of other types of vehicles, including those of aircraft, drones, automobiles, ships, spacecraft, or any other unmanned, autonomous and/or Internet-connected vehicle. Further, for the purposes of the present disclosure, the terms "RPA" for remote pilot aircraft and "UAM vehicle" for urban air mobility vehicle may be used interchangeably.

Figure 2:
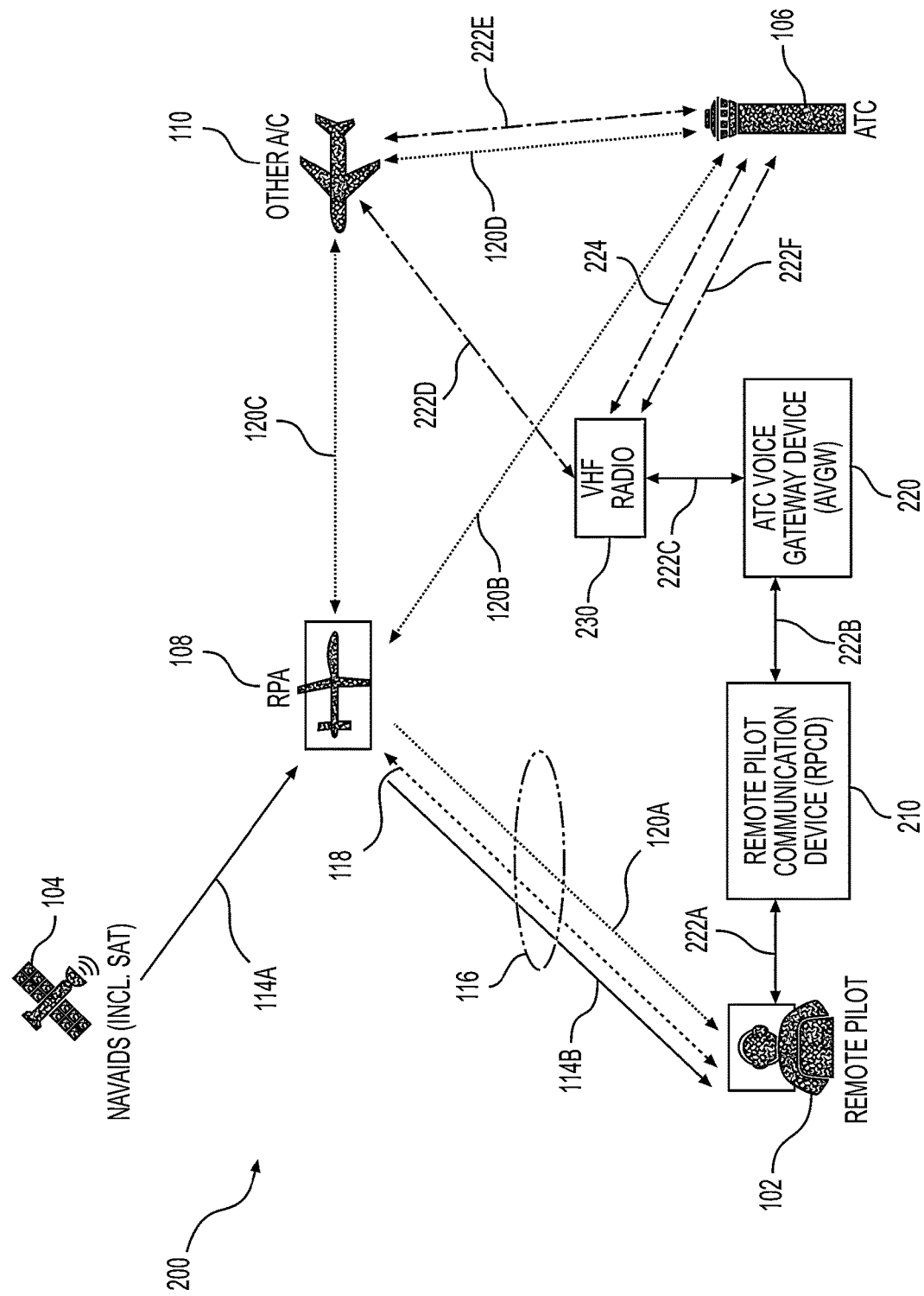
FIG. 2 depicts an exemplary system, according to one or more embodiments.

As shown in FIG. 1, FIG. 1 depicts an example environment in which methods, systems, and other aspects of the present disclosure may be implemented. For the purpose of the present disclosure, FIG. 1 is provided to show an example environment for an air traffic control sector or a controlled airspace, in which various forms of data (e.g. communication data, surveillance data, etc.) are exchanged (i.e. transmitted and/or received) between air traffic control (ATC), a remote pilot operating a UAM vehicle, and other aerial vehicles. While FIG. 1 may depict customary routes for the transmission and reception of data in a controlled airspace, the transmission and reception of data, including communication data, in a controlled airspace according to the embodiments of the present disclosure, is depicted as shown in FIG. 2. FIG. 1 shows the types of data transmitted in an air traffic control sector as well as possible transmitters and recipients, while FIG. 2 depicts an exemplary system according to the present disclosure. A more detailed description of a system for facilitating remote user airspace communication is provided further below in reference to FIG. 2.

The environment of FIG. 1 may include an airspace 100, a remote pilot 102, and an air traffic control station (ATC) 106. Remote pilot 102 may be located at a ground station or any other facility or center that is on the ground and equipped for the remote operation of a vehicle, such as a UAM vehicle or an aircraft. For instance, remote pilot 102 may operate remote pilot aircraft (RPA) 108. RPA 108 may travel through airspace 100, under the control/navigation of remote pilot 102. Other aircraft (other A/c) 110 may also travel through 100 and may be in proximity to RPA 108.

Airspace 100 may be a controlled airspace. ATC 106, which is located on the ground, may direct and/or provide guidance to RPA 108 and other A/c 110 as they travel through controlled airspace 100. For example, ATC 106 may be a control tower located on the ground and may serve as a location for air traffic controllers, air traffic control specialists, and any other personnel responsible for the flow of air traffic and related matters. ATC 106 may be located underneath a designated part of airspace 100 and the air traffic controllers therein may provide support and assistance to the designated or assigned part of airspace 100. ATC 106 may control the part of airspace 100 shown in FIG. 1, which makes airspace 100 as depicted a controlled airspace. In some embodiments, the environment surrounding and including ATC 106, also including (controlled) airspace 100, RPA 108, and other A/c 110, may be considered an air traffic control sector.

FIG. 1 also depicts various forms of communication that may exist and that may be necessary in the example environment as described above. For example, FIG. 1 shows an example environment where voice communication data is exchanged between vehicles and air traffic control in an air traffic control sector. Voice communication data 112 may be exchanged between remote pilot 102 and ATC 106 as shown, wherein the transmission and/or the reception of the communication data 112 occurs on the ground. A radio may be located on board RPA 108. Voice communication data 122B may also be exchanged between remote pilot 102 and ATC 106 by way of RPA 108, which exchanges voice communication data 122A with remote pilot 102. In addition, voice communication data 122C may be exchanged between remote pilot 102 and other A/c 110 by way of RPA 108, which exchanges voice communication data 122A with remote pilot 102. Voice communication data 122D may be exchanged between other A/c 110 and ATC 106.

The voice communication data (e.g. 112, 122A, 122B, 122C, and 122D) in the environment of FIG. 1 may be in the form of analog data or digital data. Other types of data may also be exchanged (e.g., transmitted or received) within the environment of FIG. 1. Satellite 104 may transmit Navaids 114A or navigation data to RPA 108 and RPA 108 may transmit Navaids inputs 114B to remote pilot 102. Navaids inputs 114B may assist remote pilot 102 in navigating RPA 108. Remote pilot 102 may transmit aviate data 118 to RPA 108. In addition to receiving aviate data 118, RPA 108 may also transmit aviate data 118 to remote pilot 102. RPA 108 may also transmit surveillance data 120A to remote pilot 102. Data, such as Navaids inputs 114B, aviate data 118, and surveillance data 120A, may be exchanged between RPA 108 and remote pilot 102 via communication data link 116. Communication data link 116 may be a command and control (C2) link, which serves as a data link between RPA 108 and remote pilot 102 at a ground control station.

In addition, RPA 108 may transmit surveillance data 120C to and receive surveillance data 120C from other A/c 110. RPA 108 may transmit surveillance data 120B to and receive surveillance data 120B from ATC 106. Further, ATC 106 may transmit surveillance data 120D to and receive surveillance data 120D from other A/c 110.

The example environment of FIG. 1, may be configured for at least one of satellite communications (SATCOM), very high frequency (VHF) communications, ultrahigh frequency (UHF) communications, high frequency (HF) communications, or any other suitable communication technology.

FIG. 2 depicts an exemplary system, according to one or more embodiments. The system 200 depicted in FIG. 2 may represent an exemplary system for facilitating remote pilot communication within the controlled airspace of an air traffic control sector. System 200 may include a remote pilot 102, a remote pilot aircraft (RPA) 108 operated by remote pilot 102, an air traffic control station (ATC) 106, and other aircraft (other A/c) 110 as previously depicted in the environment of FIG. 1. Also depicted in system 200 is remote pilot communication device (RPCD) 210, ATC voice gateway device (AVGW) 220, and VHF radio 230. The three main components for facilitating remote pilot airspace communication in system 200 are RPCD 210, AVGW 220, and VHF radio 230. According to the present disclosure, RPCD 210 may allow remote pilot 102 to communicate with ATC 106 and other A/c 110 through ground communication device, AVGW 220. VHF radio 230 may allow ATC 106 and other A/c 110 to communicate with remote pilot 102 through ground communication device, AVGW 220.

RPCD 210 may serve as a user device, which remote pilot 102 may use to communicate with ATC 106 and other A/c 110 through AVGW 220. A suitable user device as used in the present disclosure may include: a desktop computer; a mobile computer (e.g., a tablet computer, a laptop computer, or a netbook computer); a smartphone; a wearable computing device (e.g., smart watch); or the like. Further, a suitable user device according to the present disclosure may be a push-to-talk or press-to-transmit (PTT) device that allows for half-duplex communication. In some embodiments, RPCD 210 may be a smartphone. In other embodiments, RPCD 210 may be a desktop computer or a mobile computer, used by remote pilot 102 at a ground station. For example, RPCD 210 may include a speaker and a microphone. In some examples, RPCD 210 may include a headset comprising a speaker and a microphone. The microphone may be connected to RPCD 210 either directly or indirectly. RPCD 210, including the microphone, may receive audio from remote pilot 102, convert the audio into analog or digital signals, and transmit the analog or digital signals to AVGW 220.

According to embodiments of the present disclosure, remote pilot 102 may use RPCD 210 to communicate with ATC 106 and other A/c 110 via AVGW 220 interfaced with VHF radio 230. For example, remote pilot 102 may talk into the microphone of RPCD 210. As shown in FIG. 2, voice communication data 222A, in the form of voice input, may be provided from remote pilot 102 to RPCD 210. RPCD 210 may convert the remote pilot's voice input into digital or digitized data. In some examples, the digital data may be in the form of voice over internet protocol (VoIP) data. Voice communication data 222B, which may be in the form of digital data, may be transmitted from RPCD 210 to AVGW 220 via data link.

RPCD 210 may also be configured to convert digital data received into analog voice. For example, RPCD 210 may receive voice communication data 222B, which may be in the form of digital data, from AVGW 220 via data link. RPCD 210 may convert the digital data to analog voice data and may output a voice message over the speaker for remote pilot 102 to hear. In some embodiments, RPCD 210 may also include a display and may be configured to convert voice communication data 222B received from AVGW 220 to printed text and to display the printed text on the display.

In order to transmit communication data 222B between RPCD 210 and AVGW 220, wherein RPCD 210 may transmit voice communication data to and receive voice communication data from AVGW 220, RPCD 210 may be configured to connect to AVGW 220. Thus, when RPA 108 operated by remote pilot 102 is in proximity to AVGW 220, RPCD 210 may be configured to establish a connection with AVGW 220. For example, while RPA 108 is within a controlled airspace (i.e. air traffic control sector) including ATC 106, AVGW 220, VHF radio 230, and other A/c 110, RPCD 210 may be connected with AVGW 220. RPCD 210 may be programmed to automatically connect with AVGW 220 based on the geolocation of RPA 108.

In certain aspects of the present disclosure, RPCD 210 may also render and display a user interface (e.g., graphical user interface). The user interface may be configured to display a pop-up list generated from a database that stores information regarding ground communication, ATC gateway devices (AVGWs) in other nearby air traffic control sectors. For example, the list may display the names and corresponding location information for the AVGW within the air traffic control sector as well as the connectivity status of the AVGW (e.g., online or offline). In some examples, the AVGW list may further display on RPCD 210 as a drop down menu. RPCD 210 may be further configured to include a button or any other mechanism that allows remote pilot 102 to prompt the pop up list to display for selecting an AVGW to connect with. In some embodiments, the pop up list configuration for RPCD 210 may be used as an alternative to automatically connecting with an AVGW. A more detailed description for automatically connecting an RPCD (e.g., RPCD 210) with an AVGW (e.g., AVGW 220) according to the present disclosure as well as semi-automatically connecting an RPCD with an AVGW is provided further below in reference to FIG. 3.

ATC voice gateway device (AVGW) 220 may serve as a gateway for all voice communication within the air traffic control sector of system 200. In particular, AVGW 220 may act as a bridge between RPCD 210 and VHF radio 230. As shown in FIG. 2, all voice communication within the air traffic control sector may pass through AVGW 220. AVGW 220 may be located on the ground and may be configured to interface with VHF radio 230, also located on the ground. AVGW 220 may be located in proximity to ATC 106. For example, AVGW 220 may be located near ATC 106 so that it satisfies being within the coverage zone of the ATC 106 radio, but avoids radio frequency interference. Rather than exchanging voice communication data on board RPA 108, which is unmanned, AVGW 220 may enable continuous and uninterrupted voice communication between remote pilot 102 and ATC 106 as well as other A/c 110, wherein the exchange of the voice communication data occurs completely on the ground.

AVGW 220 may exchange voice communication data 222B with RPCD 210. Voice communication data 222C may also be exchanged with VHF radio 230. Thus, voice communication data 222D and 222F provided from other A/c 110 and ATC 106, respectively, may be transmitted to RPCD 210 via AVGW 220 which interfaces with VHF radio 230. AVGW 220 may be configured to convert analog voice received to digital data as well as digital data received to analog voice. For example, if ATC 106 transmits analog voice data, then AVGW 220 may convert the analog voice data received via VHF radio 230 to digital data. AVGW 220 may then transmit the digital data to RPCD 210.

AVGW 220 may also be configured to control VHF radio 230 radio transmission. AVGW 220 may be capable of commanding VHF radio 230 to transmit voice communication data from RPCD 210. AVGW 220 may also be capable of commanding VHF radio 230 into receiving mode. In some embodiments, when a remote pilot 102 uses the push to talk (PTT) function on RPCD 210, AVGW 220 may command VHF radio 230 to transmit the voice communication from remote pilot 102 across the carrier frequency. For example, voice communication data 222B may be transmitted. When the push to talk or press to transmit function for RPCD 210 is not being used, AVGW 220 may command VHF radio 230 into receiving mode.

In addition to converting analog voice and digital data as well as controlling radio transmission for VHF radio 230, AVGW 220 may also be configured to form a ground network of a plurality of connected AVGW devices across different air traffic control sectors. A more detailed description for the AVGW ground device network infrastructure is provided further below in reference to FIG. 3. In at least one embodiment, AVGW 220 may also be configured to provide the status of all other AVGWs that it is connected with in various air traffic control sectors, upon user request via RPCD 210. For example, AVGW 220 may be capable of providing whether another AVGW in a different air traffic control sector is online or offline.

VHF radio 230 may function in the same manner that radios on board an aircraft function. According to the present disclosure, VHF radio 230 may be located on the ground within an air traffic control sector and will be a different radio from the ATC 106 radio(s). VHF radio 230 may be located within system 200 (i.e. same air traffic control sector as ATC 106) in a location that does not cause interference with the ATC 106 radio. VHF radio 230 may be configured to have the same performance and be tuned identically (e.g. frequency, transmission power level, and receiving SQL) with an ATC 106 radio.

As discussed above, VHF radio 230 may be configured to interface with AVGW 220. The interface between VHF radio 230 and AVGW 220 may enable two voice line or bi-directional analog voice communications. The interface with AVGW 220 may also enable VHF radio 230 to transmit when remote pilot 102 uses the PTT function (e.g., button or key) on RPCD 210. Lastly, the interface with AVGW 220 may also enable a receiver activating line, which provides remote pilot 102 with active voice communication from the air, such as voice communication (e.g., 222D) from other A/c 110. As shown in FIG. 2, voice communication data 222D may be exchanged with other A/c 110 via VHF radio 230 interfaced with AVGW 220 and voice communication data 222F may be exchanged with ATC 106 via VHF radio 230 interfaced with AVGW 220.

In addition, VHF radio 230 may be configured to wire a suppression line 224 to its peer ATC 106 radio. For example, VHF radio 230 may be configured to have a suppression line 224 linked between VHF radio 230 and the ATC 106 radio. A suppression signal (not depicted) may be generated when either VHF radio 230 or an ATC 106 radio is transmitting. In some embodiments, a signal (voltage) level (e.g., suppression signal) for suppression line 224 may change to reflect a "suppression" state. A high voltage level may reflect an inactive suppression state and a low voltage level may reflect an active suppression state. For example, when none of the radios in system 200 or the air traffic control sector are transmitting (e.g., in receiving mode), suppression line 224 may remain at a high voltage level. In other words, the suppression signal (not depicted) may be inactive. However, when a radio such as VHF radio 230 is transmitting, the suppression signal will become active. The suppression line 224 may be at a low voltage level, so that the ATC 106 radio(s) are unable to transmit. Without being bound by theory, it is believed that the generation of a suppression signal between VHF radio 230 and ATC 106 radio(s), may prevent hardware failure and unwanted interferences.

While system 200 includes VHF radio 230, other radios, such as a High Frequency (HF) radio or a UHF radio, may also be used in systems according to the present disclosure. Further, the other forms of data, such as surveillance data, depicted in system 200 may be exchanged between remote pilot 102, other A/c 110, and ATC 106 as discussed above in reference to the environment of FIG. 1.

Figure 3:
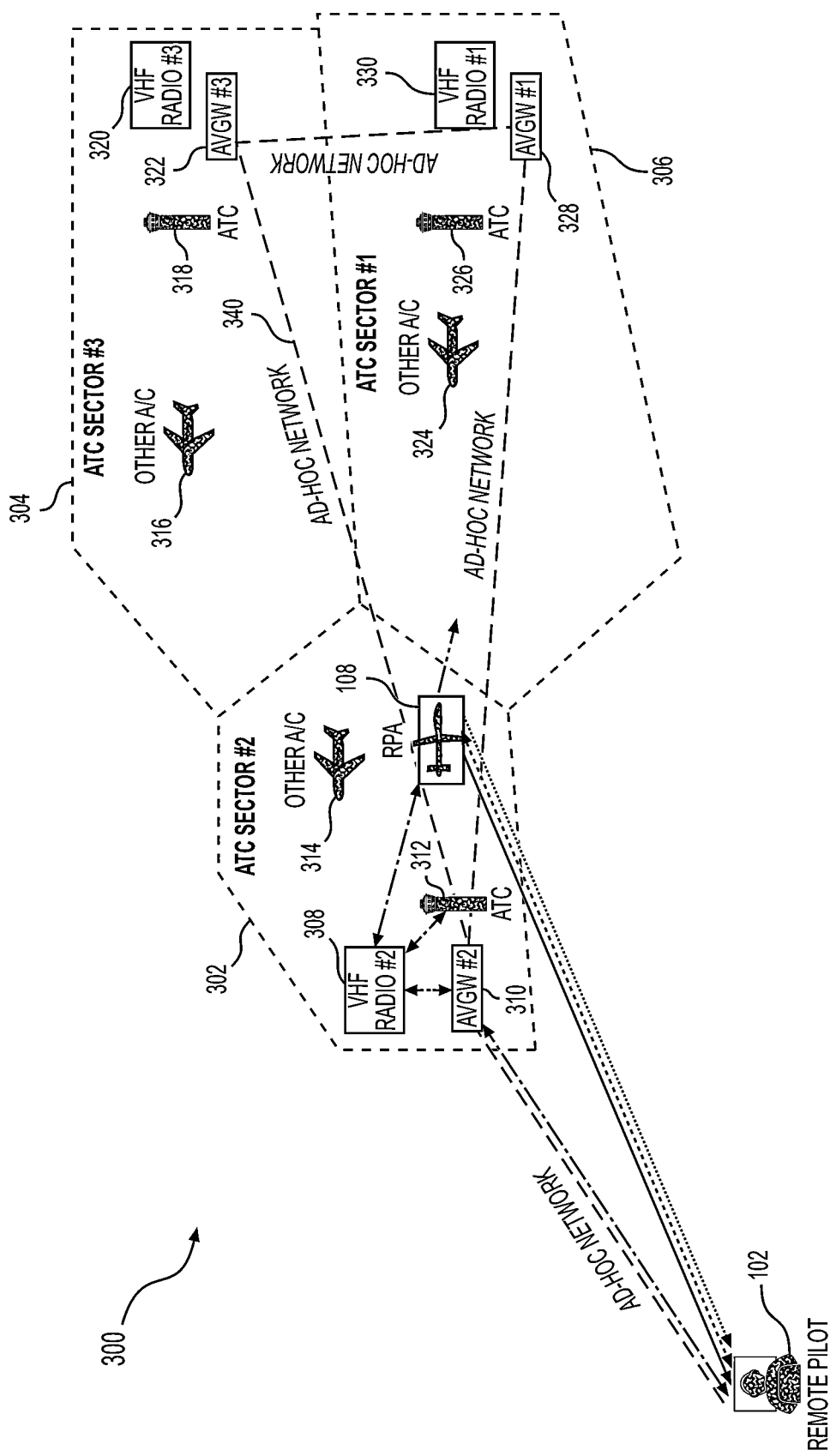
FIG. 3 depicts another exemplary system, according to one or more embodiments.

FIG. 3 illustrates another exemplary system according to the present disclosure. In particular, system 300 may represent an expansion of system 200 discussed above. System 300 may include multiple air traffic control sectors. For example, system 300 includes ATC sector #1, ATC sector #2, and ATC sector #3. ATC sector #1 includes VHF radio 330, AVGW 328, ATC 326, and other A/c 324. ATC sector #2 includes VHF radio 308, AVGW 310, ATC 312, and other A/c 314. ATC sector #3 includes VHF radio 320, AVGW 322, ATC 318, and other A/c 316.

Each ATC voice gateway device in system 300, including AVGW 310, AVGW 322, and AVGW 328, may be located on the ground within an air traffic control sector and may interface with the respective VHF radio. Furthermore, as depicted in FIG. 3, each AVGW may be connected via ground network infrastructure. For example, AVGW 310, AVGW 322, and AVGW 328, form an ad-hoc network. The ad-hoc network of system 300 includes node 302, node 304, and node 306. Node 302 encompasses ATC sector #2, node 304 encompasses ATC sector #3, and node 306 encompasses ATC sector #1. The ad-hoc network formed by the connection between AVGW 310, AVGW 322, and AVGW 328, may enable data communication, including voice communication, between any of the nodes within the network.

In addition, the ad-hoc network formed in system 300 may allow remote pilot 102 using a remote pilot communication device or RPCD as discussed above (e.g., RPCD 210) to join the ad-hoc network, as a different type of node. Once remote pilot 102 joins the ad-hoc network via RPCD 210, RPCD 210 may be able to establish a link to or connection with any of the AVGW nodes in system 300. In some examples, the network infrastructure may be an internet or dedicated network. Furthermore, the ad-hoc network formed may be dynamic and capable of expansion.

Also depicted in FIG. 3, is the flight path of RPA 108 operated by remote pilot 102. RPA 108 is shown as it is exiting ATC sector #2 (node 302) and entering ATC sector #1 (node 306). When RPA 108 enters ATC sector #1, the connection of remote pilot 102 via RPCD 210 with AVGW 328 in node 306 may be established and the connection with AVGW 310 in node 302 may be terminated or disconnected. System 300 allows for remote pilot 102 using RPCD 210 to switch connections between AVGW 310, AVGW 322, and AVGW 328. According to the present disclosure, the switching may occur automatically or semi-automatically.

In some embodiments, RPCD 210 used by remote pilot 102 may automatically switch AVGWs based on the current position (Latitude/Longitude/Altitude) of RPA 108. The real-time position data of a UAM vehicle, such as RPA 108, may be obtained via C2 link (e.g., communication data link 116) and transmitted to a remote pilot, such as remote pilot 102, at a ground station. In certain aspects of the present disclosure, the remote user device, such as RPCD 210, may be configured to interface with a computer located at the ground station of the remote pilot and obtain the position data. As discussed above, RPCD 210 may be configured to store a database comprising information pertaining to each of the connected AVGWs in different air traffic control sectors. RPCD 210 may be capable of performing a calculation to determine when RPA 108 will enter ATC sector #1. The calculation may be based on parameters such as the position data and speed trends of RPA 108. When RPCD 210 determines that RPA 108 will enter a new ATC sector (e.g., ATC sector #1) within a predefined threshold, RPCD 210 may automatically switch to a new AVGW selected from the database.

For example, when RPCD 210 determines that RPA 108 will enter ATC sector #1, the corresponding AVGW for ATC sector #1 (e.g., AVGW 328) will automatically be selected. An exemplary predefined threshold duration used to predict or determine when RPA 108 will enter a new ATC sector may be 1 minute or less prior to entering a new ATC sector. According to the present disclosure, the act of switching a connection between a remote pilot device, such as RPCD 210, and a ground communication gateway device, such as an AVGW, involves disconnecting an active connection between an RPCD and the current AVGW and establishing a new connection with an AVGW in the next ATC sector. In some embodiments, disconnecting an active AVGW connection and establishing a new AVGW connection may occur simultaneously or substantially simultaneously. In other words, as a connection with a new ground communication device is established the existing connection with a ground communication device will terminate.

In other aspects of the disclosure, switching the connection between the remote pilot communication device (e.g., RPCD 210) and a ground communication device (e.g., an AVGW) may occur semi-automatically. As discussed above in reference to FIG. 2, the user interface for RPCD 210 may be configured to display a pop-up list in the form of a drop down menu, generated from a database that stores information regarding ground communication, ATC gateway devices (AVGW) in other nearby air traffic control sectors. In some embodiments, the pop-up list may also be generated and displayed on a computer at the ground station of remote pilot 102 that interfaces with the RPCD (e.g., RPCD 210).

When the switching is semi-automatic, the remote pilot 102 may be prompted to select an AVGW, such as AVGW 328, from the pop up list of AVGWs. For example, as RPA 108 approaches the border between ATC sector #2 and ATC sector #1, RPCD 210 may determine when RPA 108 will enter the new ATC sector using the parameters used in the automatic switching embodiment, including a predefined threshold based on position data and speed trends, and display an alert and message for remote pilot 102 to select the AVGW for the new ATC sector. In this scenario, the alert and message may prompt remote pilot 102 to select the AVGW (e.g., AVGW 328) for ATC sector #1. In other examples, remote pilot 102 may use RPCD 210 to pull up the list of AVGWs for selection based on their own judgment regarding when it may be necessary to switch a connection or after receiving instructions (e.g., voice communication) from air traffic control to switch air traffic control sectors.

Figure 4:
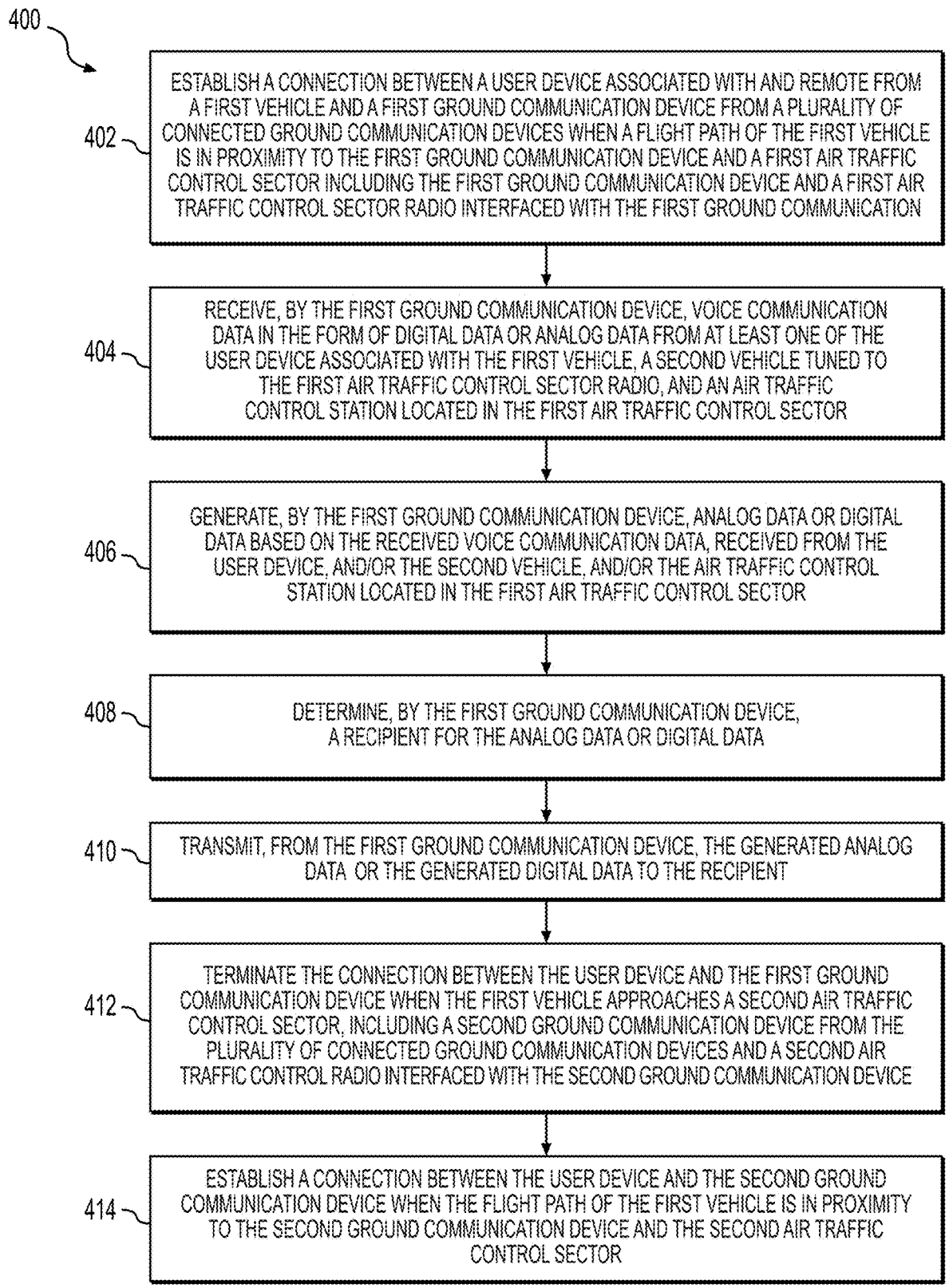
FIG. 4 depicts an exemplary block diagram of a method for facilitating remote user airspace communication, according to one or more embodiments.

FIG. 4 depicts an exemplary block diagram of a method 400. The method 400 includes steps for facilitating remote user airspace communication using the systems described above.

Step 402 involves establishing a connection between a user device associated with and remote from a first vehicle, and a first ground communication device from a plurality of connected ground communication devices when a flight path of the first vehicle is in proximity to the first ground communication device and a first air traffic control sector including the first ground communication device and a first air traffic control sector radio interfaced with the first ground communication device.

Step 404 involves receiving, by the first ground communication device, voice communication data in the form of digital data or analog data from at least one of the user device associated with the first vehicle, a second vehicle tuned to the first air traffic control sector radio, and an air traffic control station located in the first air traffic control sector.

Step 406 involves, generating, by the first ground communication device, analog data or digital data based on the received voice communication data, received from the user device, and/or the second vehicle, and/or the air traffic control station located in the first air traffic control sector.

Step 408 involves, determining, by the first ground communication device, a recipient for the analog data or digital data. In some embodiments, the first ground communication device may determine the recipient by commanding the first air traffic control sector radio (e.g., VHF radio) into transmitting mode or receiving mode. Step 410 involves, transmitting, from the first ground communication device, the generated analog data or the generated digital data to the recipient.

Step 412 involves terminating the connection between the user device and the first ground communication device when the first vehicle approaches a second air traffic control sector, including a second ground communication device from the plurality of connected ground communication devices and a second air traffic control sector radio interfaced with the second ground communication device.

Step 414 involves establishing a connection between the user device and the second ground communication device when the flight path of the first vehicle is in proximity to the second ground communication and the second air traffic control sector.

Figure 5:
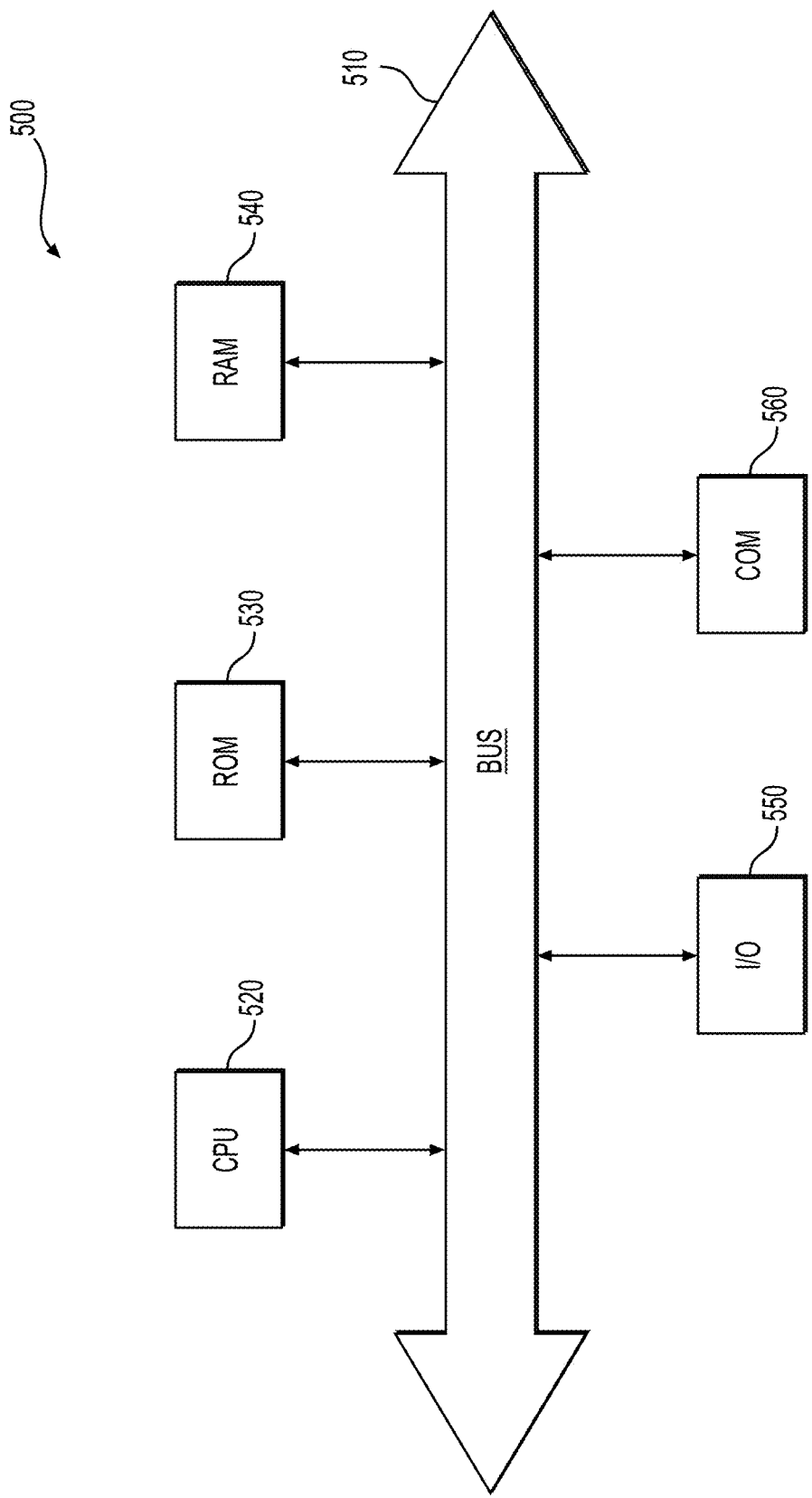
FIG. 5 depicts an example system that may execute techniques presented herein.

FIG. 5 depicts an example system that may execute techniques presented herein. In particular, the example system as depicted in FIG. 5 may be used to execute the techniques discussed above performed by the ground communication gateway device (AVGW) as well as the remote user device (RPCD). FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for facilitating remote user airspace communication, the method comprising:
    establishing a connection between a user device associated with and remote from a first vehicle, and a first ground communication device from a plurality of connected ground communication devices when a flight path of the first vehicle is in proximity to the first ground communication device and a first air traffic control sector including the first ground communication device and a first air traffic control sector radio interfaced with the first ground communication device;
    receiving, by the first ground communication device, voice communication data in the form of digital data or analog data from at least one of the user device associated with the first vehicle, a second vehicle tuned to the first air traffic control sector radio, and an air traffic control station located in the first air traffic control sector;
    generating, by the first ground communication device, analog data or digital data based on the received voice communication data, received from the user device, and/or the second vehicle, and/or the air traffic control station located in the first air traffic control sector;
    determining, by the first ground communication device, a recipient for the analog data or digital data;
    transmitting, from the first ground communication device, the generated analog data or the generated digital data to the recipient;
    terminating the connection between the user device and the first ground communication device when the first vehicle approaches a second air traffic control sector, including a second ground communication device from the plurality of connected ground communication devices and a second air traffic control sector radio interfaced with the second ground communication device; and
    establishing a connection between the user device and the second ground communication device when the flight path of the first vehicle is in proximity to the second ground communication device and the second air traffic control sector.

2. The method of claim 1, wherein a calculation is performed to determine when the first vehicle will enter the second air traffic control sector.

3. The method of claim 1, wherein terminating the connection between the user device and the first ground communication device and establishing a connection between the user device and the second ground communication device occur substantially simultaneously.

4. The method of claim 3, wherein terminating the connection between the user device and the first ground communication device and establishing a connection between the user device and the second ground communication device occur automatically, without user intervention.

5. The method of claim 1, further comprising causing a user to select on the user device a second ground communication device to establish a connection with when the first vehicle approaches a second air traffic control sector.

6. The method of claim 1, wherein the voice communication data in the form of digital data received by the first ground communication device from the user device has been converted from analog data to digital data by the user device.

7. The method of claim 1, wherein the second vehicle transmits analog data to the first air traffic control sector radio and wherein the first ground communication device transmits generated digital data based on analog data received from the second vehicle to the user device.

8. The method of claim 1, further comprising generating a suppression signal between the first air traffic control sector radio and other radios located in the first air traffic control sector when the first air traffic control sector radio transmits voice communication data or when one of the other radios transmits voice communication data.

9. The method of claim 1, further comprising:
receiving, by the second ground communication device, voice communication data from at least one of the user device associated with the first vehicle, a third vehicle tuned to the second air traffic control sector radio, and an air traffic control station located in the second air traffic control sector, after a connection has been established between the user device and the second ground communication device;
generating, by the second ground communication device, analog data or digital data based on the received voice communication data, received from the user device, and/or the third vehicle, and/or the air traffic control station located in the second air traffic control sector;
determining, by the second ground communication device, a recipient for the analog data or digital data;
transmitting, from the second ground communication device, the generated analog data or the generated digital data to the recipient;
terminating the connection between the user device and the second ground communication device when the first vehicle approaches a third air traffic control sector, including a third ground communication device from the plurality of connected ground communication devices and a third air traffic control sector radio interfaced with the third ground communication device; and
establishing a connection between the user device and the third ground communication device when the flight path of the first vehicle is in proximity to the third ground communication device and the third air traffic control sector.

10. The method of claim 1, wherein determining recipient for the analog data or digital data comprises commanding the first air traffic control sector radio into receiving mode or transmission mode.

11. A system for facilitating remote user airspace communication, the system comprising:
a user device, associated with and remote from a vehicle, the user device configured to:
establish a connection with a ground communication device from a plurality of connected ground communication devices, located in an air traffic control sector, when a flight path of the vehicle is in proximity to the ground communication device;
transmit analog data or digital data to a ground communication device selected from a plurality of connected ground communication devices, once a connection has been established between the user device and the ground communication device;
receive analog data or digital data from a ground communication device selected from a plurality of connected ground communication devices, once a connection has been established between the user device and the ground communication device; and
switch a connection with a ground communication device from a plurality of connected ground communication devices to a connection with a different ground communication device from the plurality of connected ground communication devices, located in a different air traffic control sector, when the flight path of the vehicle is in proximity to the different ground communication device;
at least one air traffic control sector radio located in at least one air traffic control sector comprising a ground communication device connected with a plurality of connected ground communication devices, the at least one air traffic control sector radio interfaced with the ground communication device; and
at least one ground communication device connected with a plurality of connected ground communication devices, each ground communication device configured to:
connect with a user device associated with and remote from a vehicle, when a flight path of the vehicle is in proximity to the ground communication device;
receive voice communication data from at least one of the user device associated with the vehicle, a second vehicle tuned to an air traffic control sector radio interfaced with the ground communication device, and an air traffic control station in proximity to the ground communication device;
generate analog data or digital data based on the received voice communication data; and
transmit the generated analog data or digital data to at least one of the user device, the second vehicle, and the air traffic control station in proximity to the ground communication device.

12. The system of claim 11, wherein switching a connection with a ground communication device from a plurality of connected ground communication devices to a connection with a different ground communication device from the plurality of connected ground communication devices comprises disconnecting an existing connection with the ground communication device and establishing a new connection with a different ground communication device.

13. The system of claim 11, wherein the user device is further configured to switch the connection with a ground communication device, automatically, without user intervention.

14. The system of claim 11, wherein the user device is further configured to:
generate a list of ground communication devices from a plurality of connected ground communication devices;
display the list of ground communication devices from a plurality of connected ground communication devices; and
prompt a user to select a ground communication device from the list for connecting with, when the vehicle approaches an air traffic control sector comprising the ground communication device.

15. The system of claim 11, wherein the at least one air traffic control sector radio is configured to:
receive voice communication data from an air traffic control station and/or a second vehicle tuned to the air traffic control sector radio;
transmit voice communication data received from the air traffic control station and/or the second vehicle to a ground communication device interfaced with the air traffic control sector radio;
receive voice communication data from the ground communication device interfaced with the air traffic control sector radio; and
transmit voice communication data received from the ground communication device to the air traffic control station and/or the second vehicle;

wherein the ground communication device receives voice communication data from and transmits voice communication to the user device.

16. The system of claim 15, wherein the at least one air traffic control sector radio is further configured to: have a suppression line linked between the air traffic control sector radio and other radios located in the same air traffic control sector, wherein a suppression signal is generated when the air traffic control sector radio transmits voice communication data or when one of the other radios transmits voice communication data.

17. The system of claim 11, wherein the plurality of connected ground communication devices form an expandable network infrastructure that enables communication of data between any node within the network.

18. The system of claim 11, wherein the at least one ground communication device is further configured to:
- command an air traffic control sector radio interfaced with the ground communication device into transmitting mode; and/or
- command an air traffic control sector radio interfaced with the ground communication device into receiving mode.

19. The system of claim 11, wherein the at least one ground communication device is further configured to:
- provide a status for each ground communication device from the plurality of connected ground communication devices.

* * * * *